Nov. 29, 1955  A. WEIGEL  2,725,110
OVER CENTER TRACTOR CLUTCH LEVER
Filed March 5, 1954
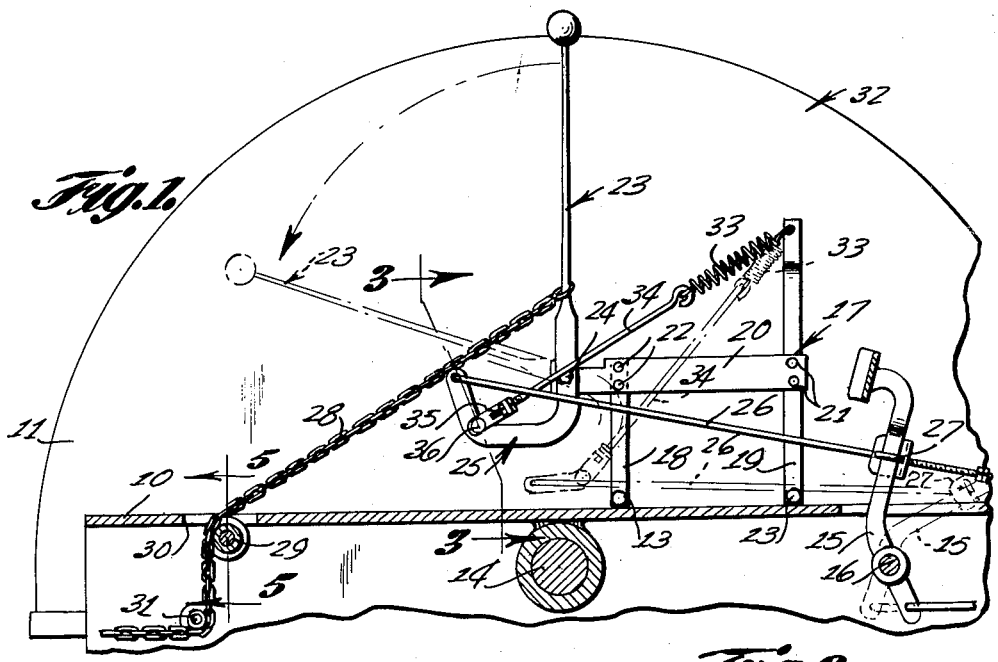
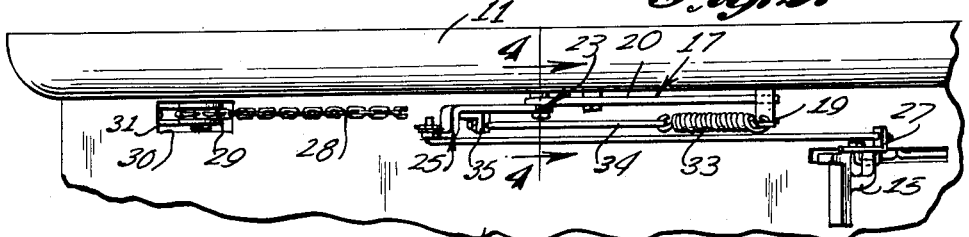
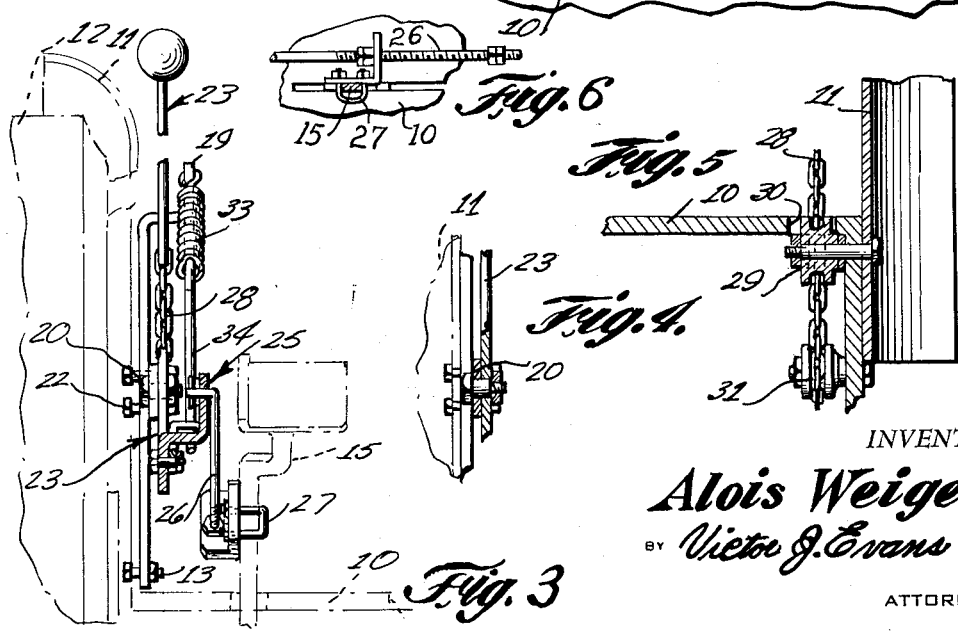
INVENTOR.
Alois Weigel
BY *Victor J. Evans & Co.*
ATTORNEYS

United States Patent Office 2,725,110
Patented Nov. 29, 1955

2,725,110

OVER CENTER TRACTOR CLUTCH LEVER

Alois Weigel, Burnstad, N. Dak.

Application March 5, 1954, Serial No. 414,282

1 Claim. (Cl. 180—14.5)

This invention relates to a tractor clutch operating mechanism, and more particularly to a mechanism for automatically moving the tractor clutch pedal upon impact of the plow or other implement with a solid object so that damage to the plow will be prevented.

The object of the invention is to provide a tractor clutch operating mechanism which will hold the clutch pedal immobile in its various adjusted positions until the clutch pedal is moved by a hand lever or when a solid object is contacted by the plow or other implement being drawn behind the tractor.

Another object of the invention is to provide a clutch operating means which will automatically throw out the clutch pedal upon impact of the plow with a solid object and wherein the clutch will be held in its thrown out position until released by the operator.

A further object of the invention is to provide an over center clutch lever which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view of the clutch operating mechanism of the present invention, and showing portions of the tractor including the axle in section.

Figure 2 is a top plan view of the assembly of the present invention.

Figure 3 is a sectional view taken on the line 3—3 of Figure 1.

Figure 4 is a sectional view taken on the line 4—4 of Figure 2.

Figure 5 is a sectional view taken on the line 5—5 of Figure 1.

Figure 6 is a fragmentary sectional view illustrating the lost motion connection between the rod and tractor clutch pedal.

Referring in detail to the drawings, the numeral 10 designates a horizontally disposed platform which may be arranged at the rear of a conventional tractor, and extending upwardly from the platform 10 are vertically disposed shields such as the shields 11. The shields 11 may be made of any suitable material such as metal, and the shields 11 are arranged contiguous to the inner surface of the tractor rear wheels 12, Figure 3. The numeral 14 designates the rear axle of the tractor, and the numeral 15 designates the tractor clutch pedal which may be mounted on a shaft 16, Figure 1.

The clutch operating means of the present invention includes a frame 17 that embodies a pair of vertically disposed spaced parallel legs 18 and 19. The legs 18 and 19 are secured to the shield 11 in any suitable manner, as for example by bolt and nut assemblies 13, and the leg 19 is of greater height than the leg 18. A horizontally disposed bar 20 extends between the legs 18 and 19 and is secured thereto in any suitable manner, as for example by means of the bolts 22 and 21, Figure 1.

There is further provided a lever 23 which is pivotally connected to the rear end of the bar 20 by means of a pin or bolt 24. The lower end of the lever 23 includes a substantially U-shaped portion 25 for a purpose to be later described. A rod 26 has its rear end pivotally connected to the free end of the U-shaped portion 25, and a bracket 27 connects the front end of the rod 26 to the clutch pedal 15, there being a conventional lost motion connection between the bracket 27 and the rod 26 which is not part of the present invention.

Connected to the lever 23 is a chain 28, and the chain 28 extends through an opening 30 in the platform 10. The chain 30 is trained over guide rollers 29 and 31, and the chain 28 is adapted to be connected to the plow or other implement being drawn or towed behind the tractor. The tractor is indicated generally by the numeral 32.

A coil spring 33 has one end connected to the upper portion of the leg 19, and an arm or rod member 34 is connected to the other end of the coil spring 33. The arm 34 is connected to a bracket 35, and the bracket 35 is pivotally connected to the U-shaped portion 25 by means of a bolt or pin 36. This off center arrangement including the arm 34 and spring 33 serves to maintain the clutch pedal 15 immobile in its various adjusted positions since the spring 33 is arranged off center with respect to the pivot pin 24.

From the foregoing it is apparent that there has been provided a clutch operating assembly which will automatically throw out the clutch pedal 15 in the event the plow or other implement being drawn behind the tractor 32 encounters a solid object so that damage to the parts will be prevented. In use when the tractor 32 is moving along the field, the parts are normally in the position shown in solid lines in Figure 1 and the off center arrangement of the spring 33 maintains the parts immobile in this position. Then, in the event that the plow encounters a solid object or obstacle, the plow will exert tension on the chain 28 to which it is attached in any suitable manner. This tension on the chain 28 will cause the lever 23 to pivot about the pin 24 and move from the solid line position of Figure 1 to the broken line position of Figure 1. Similarly the other associated parts will also move from the solid line position to the broken line position and as the lever 23 pivots about the pin 24 the rod 26 will be moved to thereby move the clutch pedal 15 to the broken line position whereby no power will be transmitted from the tractor engine to the wheels so that forward motion of the tractor will be arrested. The spring 33 will again maintain the parts immobile in the position shown in broken lines in Figure 1 until the lever 23 is manually moved to return the parts to the solid line position so that the tractor can again move forward under its own power.

The present assembly can be readily attached to the tractor without interfering with normal operation of the tractor, and the present invention provides an automatic means for throwing out the clutch pedal 15 when an obstacle is encountered by the plow and also the clutch pedal is releasably held in its various positions. The chain 28 is adapted to be connected to a plow or other implement.

I claim:

In combination, a horizontally disposed tractor platform, a vertically disposed wheel shield arranged contiguous to said platform, a clutch pedal pivotally projecting through said platform, a frame secured to said shield and including a front and rear vertically disposed leg, a horizontally disposed bar extending between said legs and secured thereto, said front leg having its upper end extending above said bar, a lever pivotally connected to the rear end of said bar and including a lower U-shaped portion disposed below said bar, a pair of rollers journaled below said platform, an implement connected chain trained over said rollers and connected to said lever, a rod having one end pivotally connected to the free end of said U-shaped portion and its other end pivotally connected to said clutch pedal for operation of said pedal to clutch disengaging position upon pivotal actuation of said lever, and force exerting means connecting said U-shaped portion to the upper end of said front leg, said means comprising a coil spring having its upper end secured to said upper end of the front leg, a bracket pivotally connected to said U-shaped portion, and a rod member having one end connected to said coil spring and its other end pivotally connected to said bracket, the force exerted by said spring toward said front leg being normally in a line above the pivotal connection of the lever to said bar whereby to maintain said lever in inoperative position.

References Cited in the file of this patent
UNITED STATES PATENTS

| | | |
|---|---|---|
| 1,923,332 | Snyder | Aug. 22, 1933 |
| 2,129,574 | Gilgenbach | Sept. 6, 1938 |
| 2,551,457 | Oerman | May 1, 1951 |